United States Patent [19]

French

[11] Patent Number: 4,883,633

[45] Date of Patent: Nov. 28, 1989

[54] PROCESS AND APPARATUS FOR PRODUCTION OF ARTICLES WITH SELECTIVELY THINNED PORTIONS USING A MULTI-RADIUS FORMING PLUG

[75] Inventor: Kent H. French, Newport News, Va.

[73] Assignee: Rampart Packaging Inc., Houston, Tex.

[21] Appl. No.: 137,839

[22] Filed: Dec. 24, 1987

[51] Int. Cl.$^4$ .............................................. B29C 51/10
[52] U.S. Cl. ................................. 264/550; 425/387.1; 425/398
[58] Field of Search ....................... 264/544, 549, 550; 425/387.1, 394, 398, 403; 215/16; 220/70

[56] References Cited

U.S. PATENT DOCUMENTS

| | | | |
|---|---|---|---|
| 3,532,786 | 10/1970 | Coffman | 264/292 |
| 3,546,746 | 12/1970 | Johnson | 425/98 |
| 4,172,875 | 10/1979 | Beijen et al. | 264/550 |
| 4,249,666 | 2/1981 | Hubert | 220/70 |

FOREIGN PATENT DOCUMENTS

| | | | |
|---|---|---|---|
| 2398669 | 3/1979 | France | 220/70 |
| 61-215035 | 9/1986 | Japan | 264/549 |
| 1367338 | 9/1974 | United Kingdom . | |

OTHER PUBLICATIONS

Gruenwald, G., PE., *Thermoforming a Plastics Processing Guild*, Jun. 1987, pp. 124 and 125.
Kostur, "Heat-Forming Techniques for Plastic Sheet", *Product Engineering*, Mid-Sep. 1960, pp. 164-169.

*Primary Examiner*—Jill L. Heitbrink
*Attorney, Agent, or Firm*—Donald F. Haas

[57] ABSTRACT

This invention relates to a method and apparatus for making cupped articles from thermoplastic sheet or billets wherein the articles are formed with a bellows bottom which will displace inwardly when the internal pressure within the cup decreases. The invention specifically relates to an improvement upon the forming process which involves clamping a heated sheet or billet of a thermoplastic material in the solid phase state between a forming plug and a hollow mold having an end opening, moving the forming plug into the opening to carry the sheet into the mold, and introducing pressure fluid into the stressed portion of the sheet to form the article by making the sheet conformed to the shape of the hollow mold. The closed end of the hollow mold is improved by forming it with a flat central portion which has a tapered portion extending outwardly therefrom. The tapered portion tapers in the direction of the open end of the mold and ends in a ridge which extends away from the open end and vertically beyond the flat central portion. A second ridge extends beyond the first. The forming plug is improved in that it has inwardly tapering sides which terminate in a curved portion which itself terminates at a plug tip. The radius of the curved portion is greater than the radius of the plug tip. Preferably, the plug tip is flattened but still rounded such that its height is less than its radius. Also, most preferably, the taper of the forming plug sides is from 9° to 11° from vertical.

10 Claims, 3 Drawing Sheets

PROCESS AND APPARATUS FOR PRODUCTION OF ARTICLES WITH SELECTIVELY THINNED PORTIONS USING A MULTI-RADIUS FORMING PLUG

FIELD OF THE INVENTION

This invention is concerned with an apparatus for making articles from a sheet or billets of thermoplastic material. The invention also relates to a method for making such articles and incorporating a bellows bottom into the design of the article.

BACKGROUND OF THE INVENTION

It is known from U.K. Specification No. 1,367,338 to make cupped articles from a sheet of a thermoplastic material such as polypropylene. Such articles can also be made from billets of the same materials. The method comprises introducing a thin sheet or a billet of the thermoplastic material in the solid phase state, i.e. below the crystalline melting point, between a forming plug and a hollow mold having an end opening, moving the forming plug into the mold opening with the sheet to carry the stretched portion of the sheet into the mold, and introducing a pressure fluid into the stretched portion of the sheet to form the article in the mold. The above method is particularly suitable for making cupped articles of polypropylene and has met with considerable commercial success.

It is known that after filling and sealing a yieldable body such as a thermoplastic container made from such a cupped article, there is a tendency for the sidewalls thereof to deform or panel inwardly under certain conditions. This deformation of the sidewalls results from deviations and pressure within the interior of the container as compared to the pressure exterior thereto and these deviations may be brought about by various physical or chemical conditions. In the packaging of food, various materials including fluids such as juices, syrups, salad oils and the like are oftentimes brought to elevated temperatures before introduction into thermoplastic containers. It has been found that there is a marked tendency for such containers to distort inwardly as described above. For example, when hot-filled containers are allowed to cool, the internal pressure will gradually decrease whereby the external atmosphere pressure causes their sidewalls to indent, panel or otherwise partially collapse. This condition renders the containers unacceptable to the ultimate consumer.

Aside from the problems associated with such hot-filled containers, there are other related packaging situations where chemical reactions cause noticeable reductions in the internal pressures of the container resulting in the paneling or deformation of the sidewalls. For example, when lubrication or motor oil is packaged in a plastic container and sealed, chemical reactions take place between the various hydrocarbon constituents and any residual oxygen, e.g. air, causing the total pressure within the container to decrease. With this drop in pressure, there results an inward paneling of the sidewalls in order to equalize or compensate for the decrease in internal pressure. Here again, as with the hot-filled container, the containers are unacceptable to the ultimate consumer.

Aside from an undesirable appearance, the container itself loses column strength and sidewall symmetry which presents a problem in nesting or stacking them for storage, display and the like. Since the reduction in internal pressure cannot always be practically avoided, the present invention provides an apparatus and method for making a container configuration wherein a portion of the base of the container compensates or yields as more fully disclosed hereinafter in preference to the sidewalls of the container.

The configuration of the bottom of the container is so designed that it will displace inwardly without affecting the integrity of the sidewalls thereof. The sidewalls are not made thicker than the base structure in order to achieve this goal but rather the base portion of the container is designed to displace inwardly in a bellows effect.

SUMMARY OF THE INVENTION

The key to the achievement of the advantages of the present invention is the multi-radius plug tip. Its use allows the forming of plastic articles which have selectively thinned portions. One such article is a cup which is formed with a bellows bottom as hereinafter described.

This invention relates to a method and apparatus for making cupped articles from thermoplastic sheet or billets wherein the articles are formed with a bellows bottom which will displace inwardly when the internal pressure within the cup decreases. The invention specifically relates to an improvement upon the forming process which involves clamping a heated sheet or billet of a thermoplastic material in the solid phase state between a forming plug and a hollow mold having an end opening, moving the forming plug into the opening to carry the sheet into the mold, and introducing pressure fluid into the stressed portion of the sheet to form the article by making the sheet conform to the shape of the hollow mold.

The closed end of the hollow mold is improved by forming it with a flat central portion which has a tapered portion extending outwardly therefrom. The tapered portion tapers in the direction of the open end of the mold and ends in a ridge which extends away from the open end and vertically beyond the flat central portion. A second ridge extends beyond the first ridge and terminates in the sidewall of the mold. The forming plug is improved in that it has inwardly tapering sides which terminate in a curved portion which itself terminates at a curved plug tip. The radius of the curved portion is greater than the radius of the curved plug tip. Preferably, the plug tip is flattened but still rounded such that its height is less than its radius. Also, most preferably, the taper of the forming plug sides is from 9° to 11° from vertical.

DETAILED DESCRIPTION OF THE INVENTION

Figure 1:
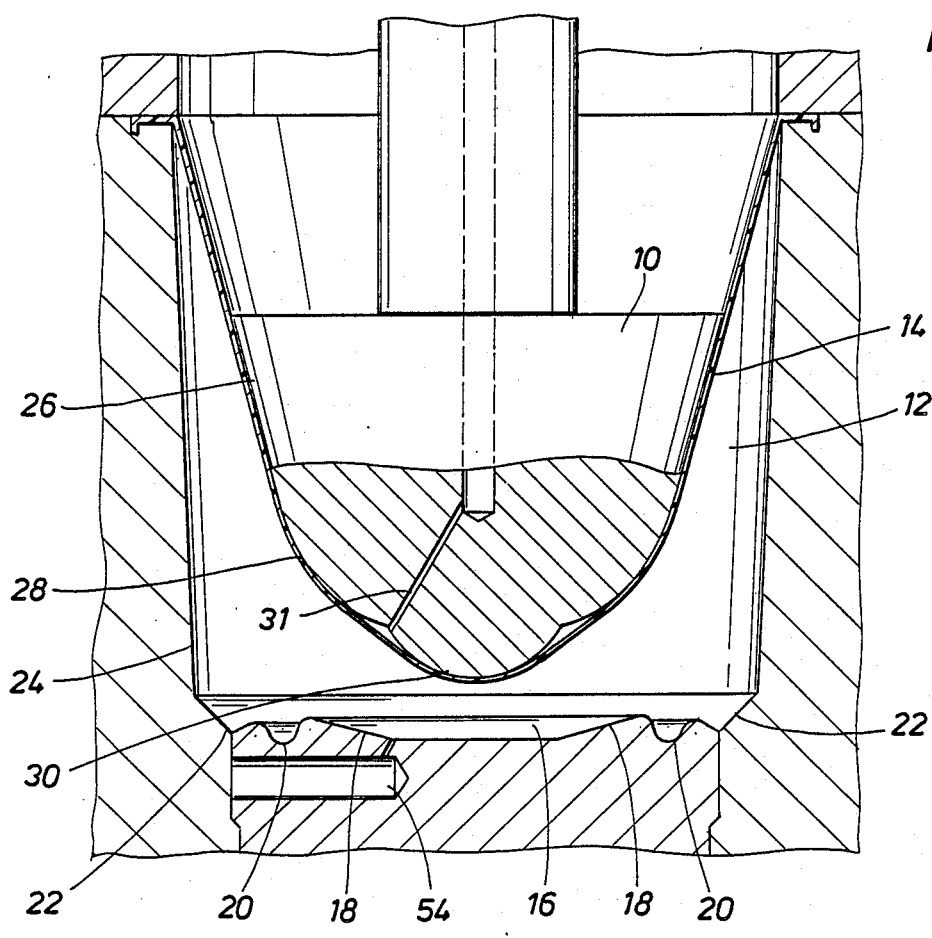
FIG. 1 illustrates the forming plug after it has been lowered into the mold. The stretched thermoplastic is shown before it is formed with the pressure fluid.

In FIG. 1 it can be seen that the forming plug 10 has been lowered into the mold 12. The thermoplastic 14 has been stretched by the forming plug 10 but has not yet been formed into the final container by injection of the pressure fluid. The bottom of the mold 12 has a flat central portion 16 which terminates in an outwardly extending upwardly tapering tapered portion 18. The tapered portion 18 ends in a first ridge 20 which extends downwardly below the vertical level of the flat central portion 16. Finally, there is a second ridge 22 which extends from the first ridge 20, is, at its lowest point, preferably above the vertical level of the portion 16 and terminates in the sidewall 24 of the mold 12.

The forming plug 10 has inwardly tapering sidewalls 26 which end in a curved portion 28 which itself ends at the curved plug tip 30. It is important that the radius of the curved portion 28 be larger than the radius of the plug tip 30 so that when the thermoplastic 14 is stretched, it loses contact with the forming plug 10 in the area where the curved portion 28 and the plug tip 30 intersect. This will cause that portion of the thermoplastic 14 to become thinner than the rest of the thermoplastic 14. The importance of the thinning is discussed below. For best results in making a straight walled container, the radius of curved portion 28 should be equal to or greater than one half the diameter across the bottom of mold 12 between the lowest points of ridge 20 and the radius of the plug tip 30 should be greater than or equal to one half the diameter across the bottom of mold 12 between the highest points of tapered portion 18.

It can be seen that the plug tip 30 is flattened on the bottom so that the vertical height of the plug tip 30 is less than the horizontal radius thereof. The amount of flattening of the plug tip 30, if any, is a matter of choice. The primary function of the forming plug 10 is to move the thermoplastic 14 down as close to the bottom of the mold 12 as possible so that when the thermoplastic 14 is formed with the pressure fluid which is injected through fluid passage 31, the walls of the formed container are thicker. The forming plug 10 cannot be allowed to contact the thermoplastic 14 after it has been formed into the container. Therefore, for many applications, if the height of the plug tip 30 is the same as the radius thereof, there will be too much thinning of the container bottom. For best results in making a straight walled container, the height, H, of the plug tip 30 is defined by the following formula: $H \leq (D_1 - D_2)/2\pi$ where $D_1$ is the diameter across the bottom of mold 12 between the highest points of tapered portion 18 and $D_2$ is the diameter of flat central portion 16. The height of the plug tip 30 is an important variable. If the height is decreased, the amount of thinning of the cupped article is decreased. If the height of the plug tip 30 is too great, the thermoplastic 14 may stretch to failure.

The taper of the sidewalls 26 of the forming plug 10 is also an important variable. If there is not enough taper, then there will be too much thinning in the sidewall of the container. For applications such as containers with straight walls with a draw ratio of 5:1 or less, the taper of the sides should be from 9° to 11° from the vertical because if the taper is less than 9°, too much material is pulled from the top, and if the taper is greater than 11°, too much material is left. Deep containers require less taper in the sidewalls and shallow containers require more taper.

As stated above, the radius of the curved portion 28 of the forming plug 10 must be greater than the radius of the plug tip 30 so that there is an area wherein the thermoplastic 14 does not come into contact with the forming plug 10. At this point, the thermoplastic 14 will be thinned out to a greater extent than at the points wherein the thermoplastic 14 comes into contact with the forming plug 10. As discussed below, this thinning of the thermoplastic is important to the design of the cupped article with the bellows bottom.

Figure 2:
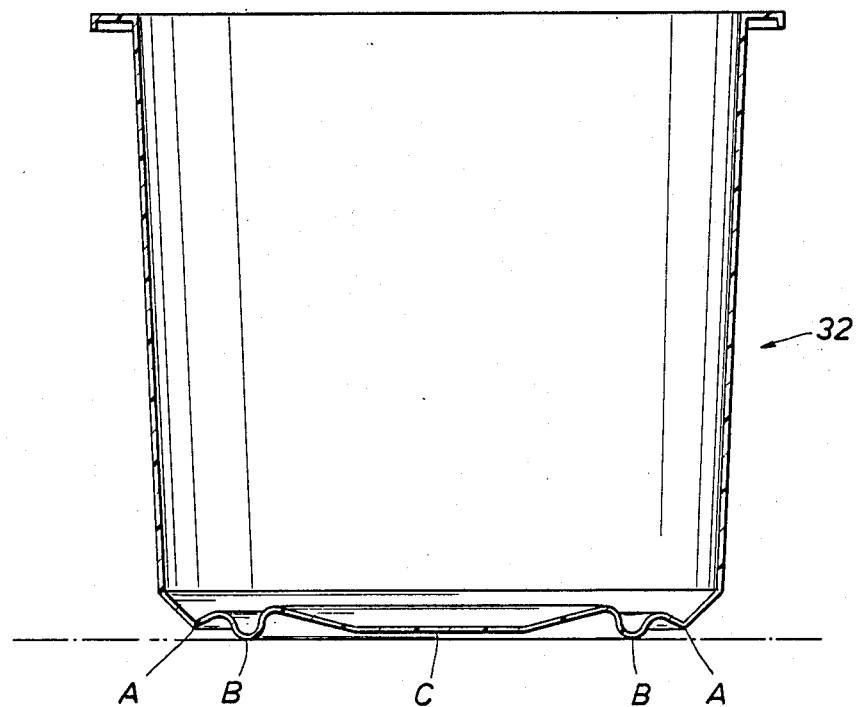
FIG. 2 shows a cupped article with a bellows bottom before it is used.

It is important that the radius of the plug tip 30 coincide with the radius of the flat central portion 16 of the mold bottom. This will cause the formation of a relatively thick, flat bottom portion of the cupped article (shown as point C in FIG. 2) which is formed when the pressure fluid is injected into the thermoplastic 14. The use of this method and apparatus forms a cupped article 32 as shown in FIG. 2. Point B, which is formed by first ridge 20, becomes the leg of the article and will also become the thinnest section of the bottom of the container 32 because this coincides with the point at which the thermoplastic 14 was not in contact with the forming plug 10. Since the thiness of point B makes it weaker, during hot-fill the weakness of point B should allow section C to drop out or extend downwardly. After cooling when the internal pressure of the cupped article 32 decreases, the weakness of point B should allow sufficient flexibility for area C to be drawn back upward by the vacuum into the container. Point A, which is formed by second ridge 22, will become the leg of the cupped article 32.

Figure 3:
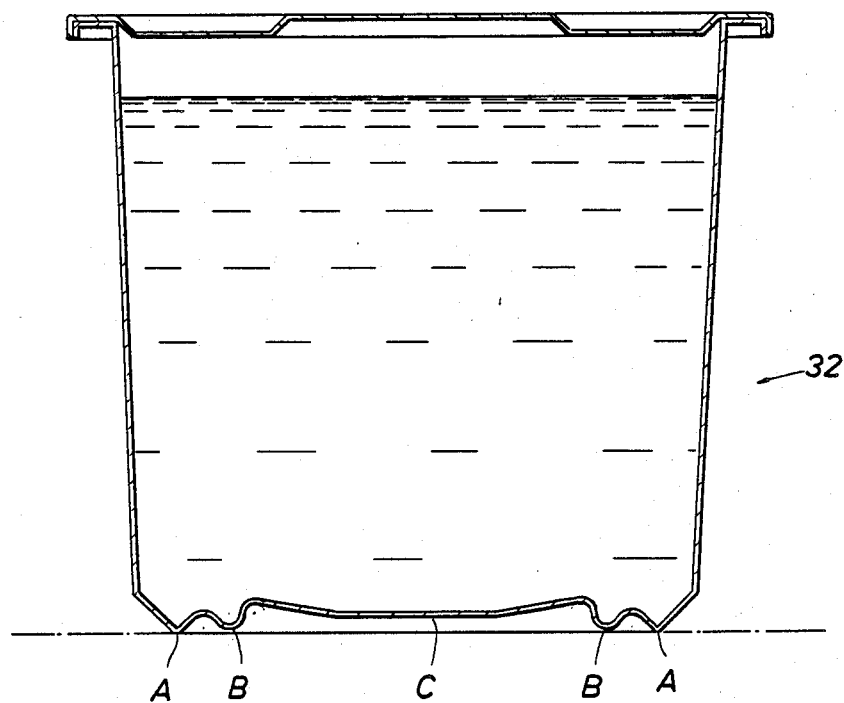
FIG. 3 illustrates a cupped article with a bellows bottom made according to the present invention after hot filling and cooling.

FIG. 3 and the foregoing description describes the design and operation of the bellows bottom. Because point B on the bottom of the cupped article 32 is weaker than the rest of the bottom of the cupped article 32 and also weaker than the sidewalls of the cupped article 32 (because it is thinner), the flat central portion 16 of the cupped article 32 will be pulled upwardly by the vacuum created inside the container 32 upon cooling after hotfill before the sidewalls of the cupped article 32 will be pulled inwardly. This will alleviate, at least to some extent, the problem of sidewall paneling discussed above. The container will have a more pleasing appearance and will be more acceptable to the ultimate consumer.

Figure 4:
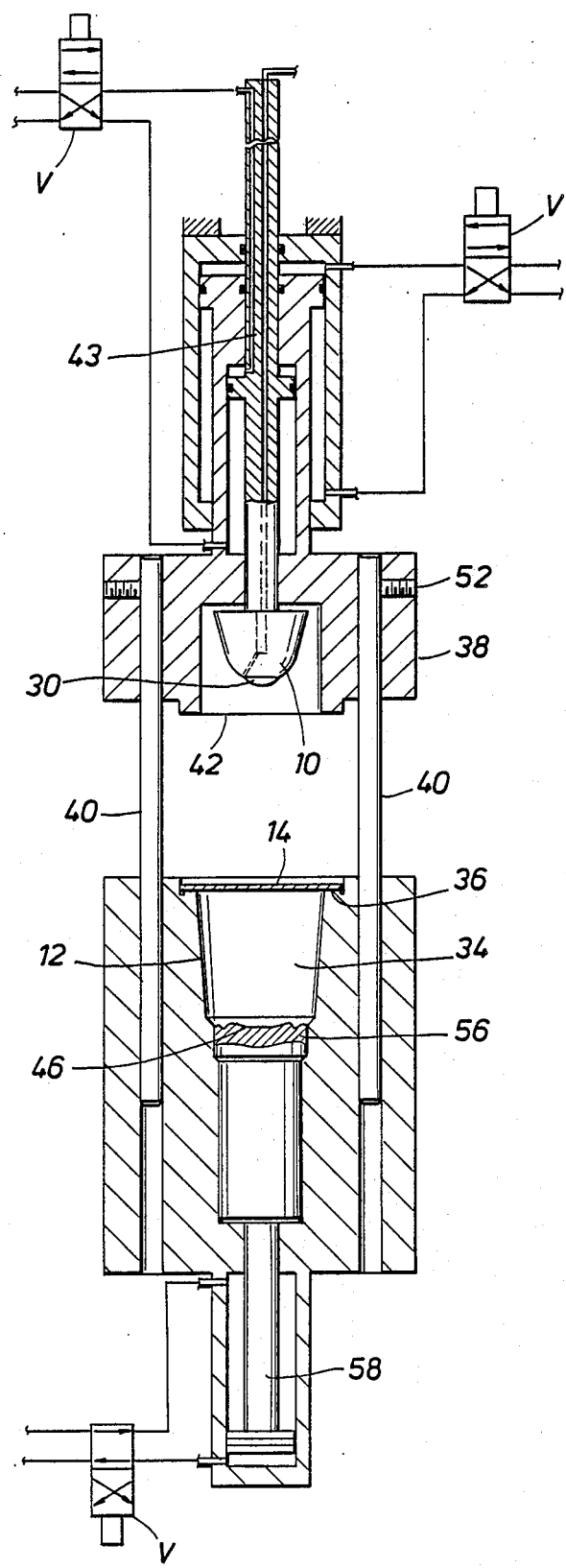
FIG. 4 is an axial section through one form of apparatus embodying the invention, the parts being shown in retracted position with a sheet blank or billet introduced with power actuating means.

Referring to FIG. 4, a forming press comprises a hollow mold 12 having a cavity or chamber 34 and an annular peripherally confined recess seat 36 for a plate-like thermoplastic blank 14. Axially-movable blank-holding and compressing means, such as an annular plunger 38, is suitably mounted on guide rods 40 to enter the enlarged seat recess portion of the chamber and clamp the annular outer edge or rim of the blank 14 upon the annular seat 36.

Figure 5:
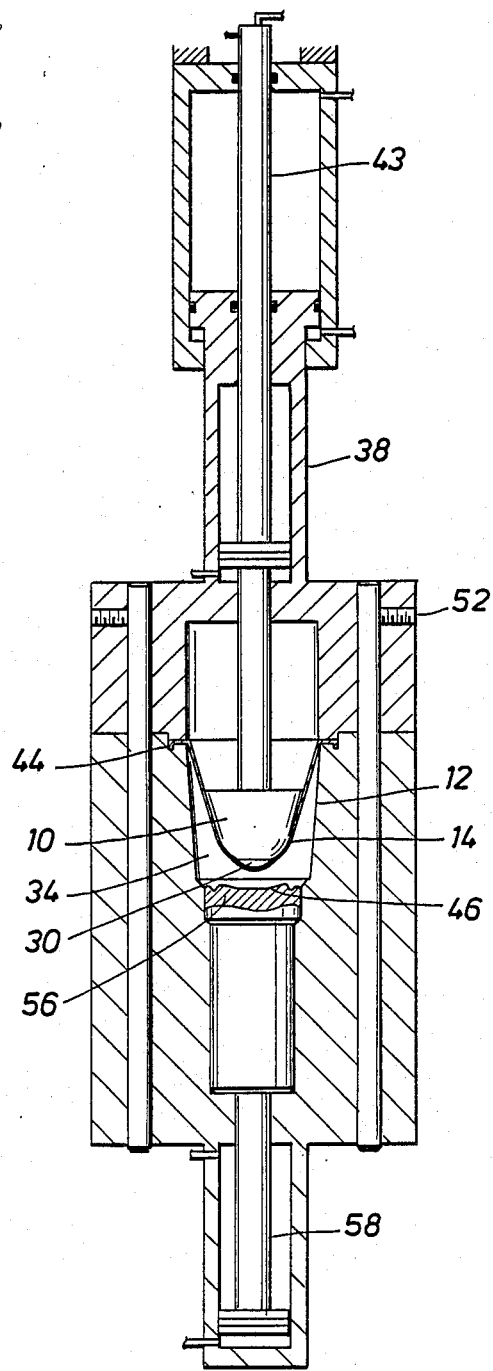
FIG. 5 is a view like FIG. 4 but with an annular blank-holding plunger closed on the blank rim and material of the rim extruded inwardly.

The forming plug 10 is arranged to move axially, by the action of rod 43, through the inner cylindrical opening 42 of the annular rim plunger 38 to engage the interior portion of the blank 14 within the outer annular clamped ring portion, an annular space or orifice 44 being provided (FIG. 5) between the inner edge of the seat and the outer periphery of the forward end of the forming plug 10. As here shown, the clamping means extends inward to closely confine and accurately guide the forming plug and also prevent upward flow of material if the clamping means thins the rim to force inventory material inward after the forming plug has engaged the blank 14.

Figure 6:
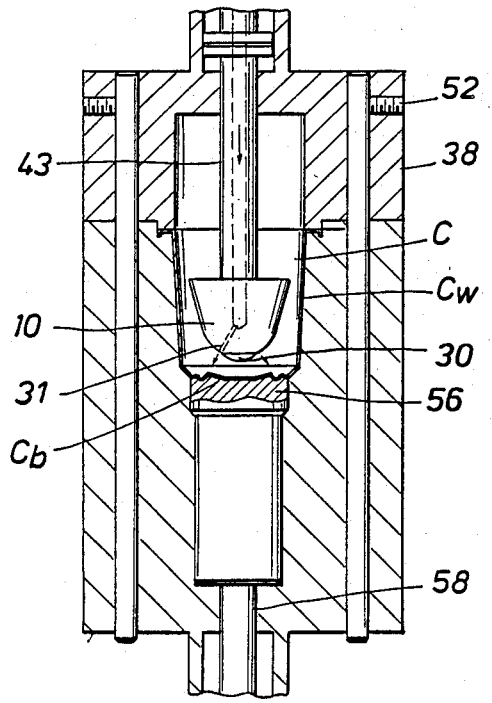
FIG. 6 is a view like FIG. 4 but showing the article, here a cup-shaped article, in fully formed condition.

The mold bottom 46 is formed as described above. When the article is fully formed, the bottom $C_b$ (FIG. 6) of the article is formed under pressure from fluid entering through fluid passage 31 in the forming plug 10.

The annular orifice space 44, when desired, is made thinner radially than the original thickness of the blank 14 and approximately the thickness of the thickest part of the sidewall $C_w$ of the container C (FIGS. 6 and 7) which is to be formed. This leaves substantially the entire inner body of the blank 14 beneath the lower end of the plunger 38 to form the sidewall of the container as the forming plug 10 advances into the forming chamber.

The clamping means or plunger 38 engages the outer edge of the blank 14 with sufficient axial pressure to hold it securely against pulling out as the article is formed but it may leave the rim at different thicknesses, as desired, from substantially the full thickness of the original blank down to a very thin rim. As shown, the rim is left with a thickness about the same as that of the sidewall of the formed container. Stops of any suitable selectable replaceable nature may be provided for limiting the downward movement of the clamping plunger, herein the stop means being shown as insertable washers of selectable thickness.

The pull-out of reservoir or inventory material from beneath the forming plug 10 is affected by the shape of the plunger 38, the relative frictional character of the material-engaging surface of the material and plunger, and other factors to be discussed. The tip 30 of the plunger herein shown is of a low-friction low-thermal-transfer substance, such as a ceramic or a thermoplastic.

Figure 7:
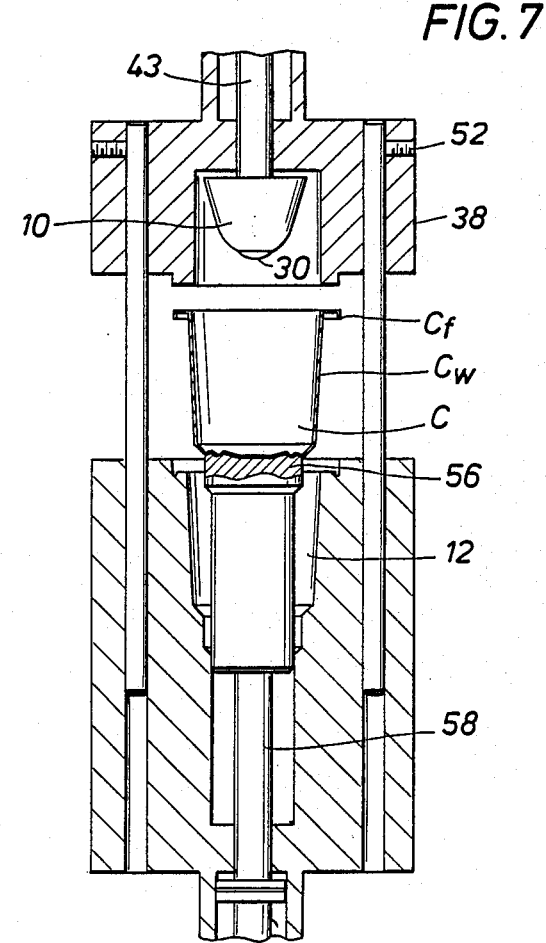
FIG. 7 is a view like FIG. 4 but showing the press open and the article ejected.

Here the forming plug 10 is provided with an axial fluid passage 31 as for air or other desired fluid. Fluids having lubricating effects may be used. An O-ring seal 52 is provided between the forming and the clamping plunger 38 to aid in retaining fluid. Fluid may be supplied to or withdrawn from beneath the blank 14 in the forming space past the opposed plunger 56, as by a chamber duct 54 (See FIG. 1), a retaining O-ring seal being provided around the stem of the opposed plunger. Opposed plunger 56 moves upward by action of rod 58 (as shown in FIG. 7) to eject the container C from the mold 12.

The pull-out of material from beneath the forming plug 10 is affected by: (a) the temperature and composition of the material itself; (b) the rate of advance of the forming plug; (c) the temperature of the forming plug; (d) its shape; (e) the frictional character of its material-engaging surface with the material being formed; (f) the character and temperature of the fluid supplied to or withdrawn from the space between the upper surface of the blank and the bottom of the forming plug; and (g) the control of the opposed plunger and the fluid supplied to or withdrawn from the space between it and the lower surface of the blank.

It may also be desirable to supply fluid around the rim of the blank to inhibit sticking and to aid the inward flow of material by extrusion when compressed axially by the clamping plunger. For this purpose, radial ducts may be provided, along with O-ring seals to inhibit fluid leakage. This is more important when the article flange $C_f$ is relatively very wide and it is to be reduced materially in thickness to supply material to be drawn, as from a second supply or inventory of material, that in the rim, into the side wall of the container C. Preferably, when there is a considerable body or inventory of rim material, this is compressed axially and forced inward gradually as the forming plunger 38 moves down to form the sidewall $C_w$ of the container C. In the case where the rim is narrow and the annular orifice is narrow, the rim material is preferably forced inward before or during the early part of the descent of the forming plug. In no case is the outer edge of the blank drawn inward bodily as is done in many sheet metal cupping operations where the material of the blank is not much thinned. The inner side of the seat recess is freely open for the inflow of rim inventory material by extrusion caused by axial compression.

Although controls for power actuating devices are now so conventional and well known to those skilled in the art that it is quite common to omit illustration of them, certain controls are sketchily indicated in FIG. 4 for coordinating the various operating elements to provide a very wide range in selectivity of action and timing. The valves are all designated as V, it being understood that they may be specifically different for various power devices and for the fluid supply and exhaust (including vacuum, where desired) for the forming plug 10. Although not shown, it is to be understood that the various elements which engage the workpiece may have temperature control means, such as fluid passages, resistor elements, or the like, in known manner.

I claim:

1. In a process for making cupped articles from thermoplastic sheet or billets which comprises clamping a heated sheet or billet of a thermoplastic material in the solid phase state between a forming plug and a hollow mold having an end opening, moving the forming plug into the opening to carry the sheet or billet into the mold and stretch a portion of the sheet or billet and introducing pressure fluid into the stretched portion of the sheet or billet to form said article by making the sheet or billet conform to the shape of the hollow mold, the improvements which comprise forming a bellows bottom in the cupped articles by providing the hollow mold with a closed end having a flat central portion, a tapered portion which extends outwardly from the central portion, tapers in the direction of the open end of the mold and ends in a first ridge which extends away from the open end and vertically beyond the flat central portion, and a second ridge which extends away from the open end of the mold and horizontally beyond the first ridge, and forming said bellows bottom with selectively thinned portions by providing the forming plug with inwardly tapering sides which terminate in a curved portion, said curved portion terminating at a plug tip wherein the radius of the curved portion is greater than the radius of the plug tip.

2. The process of claim 1 wherein the radius of the curved portion of the forming plug is equal to or greater than one half the diameter across the closed end of the mold between the lowest points of the first ridge and the radius of the plug tip is greater than or equal to one half the diameter across the closed end of the mold between the highest points of the tapered portion.

3. The process of claim 1 wherein the height of the plug tip measured in the direction in which the plug moves is less than its radius measured in the direction transverse to the direction in which the plug moves.

4. The process of claim 3 wherein the height of the plug tip, H, is defined by the formula:

$$H \leq (D_1 - D_2)/2\pi$$

wherein $D_1$ is the diameter across the closed end of the mold between the highest points of the tapered portion and $D_2$ is the diameter of the flat central portion.

5. The process of claim wherein the taper of the forming plug sides is from 9 degrees to 11 degrees from the direction in which the plug moves.

6. In an apparatus for making cupped articles from thermoplastic sheets or billets which comprises a frame structure, a forming plug, a hollow mold connected to the frame structure and having an end opening, means for clamping a heated sheet or billet between the forming plug and the mold, means connected to the frame for moving the forming plug into the opening to carry the sheet or billet into the mold and stretch the sheet or billet and removing it once the article is formed, and means for introducing pressure fluid into the stretched sheet or billet to form said article by making the sheet or billet conform to the shape of the mold, the improvements which comprise the closed end of the hollow mold having a flat central portion, a tapered portion which extends outwardly from the central portion, tapers in the direction of the open end of the mold and ends in first ridge which extends away from the open end and vertically beyond the flat central portion, and a second ridge which extends away from the open end of the mold and horizontally beyond the first ridge, and the forming plug having inwardly tapering sides which terminate in a curved portion, said curved portion terminating at a plug tip wherein the radius of the curved portion is greater than the radius of the plug tip.

7. The apparatus of claim 6 wherein the radius of the curved portion of the forming plug is equal to or greater than one half the diameter across the closed end of the mold between the lowest points of the first ridge and the radius of the plug tip is greater than or equal to one half the diameter across the closed end of the mold between the highest points of the tapered portion.

8. The apparatus of claim 6 wherein the height of the plug tip measured in the direction in which the plug moves is less than its radius measured in the direction transverse to the direction in which the plug moves.

9. The apparatus of claim 8 wherein the height of the plug tip, H, is defined by the formula:

$$H \leq (D_1 - D_2)/2\pi$$

wherein $D_1$ is the diameter across the closed end of the mold between the highest points of the tapered portion and $D_2$ is the diameter of the flat central portion.

10. The apparatus of claim 6 wherein the taper of the forming plug sides is from 9 degrees to 11 degrees from the direction in which the plug moves.

* * * * *